(12) United States Patent
Hill et al.

(10) Patent No.: US 9,237,070 B2
(45) Date of Patent: Jan. 12, 2016

(54) DEVELOPMENT, TEST, AND DEMONSTRATION OF AUTOMATION SOLUTIONS USING WEB-BASED VIRTUAL COMPUTERS AND VPN TUNNELING

(75) Inventors: Roger Hill, Kingsport, TN (US); Wayne Cantrell, Blountville, TN (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 1276 days.

(21) Appl. No.: 12/505,987

(22) Filed: Jul. 20, 2009

(65) Prior Publication Data

US 2010/0023600 A1    Jan. 28, 2010

Related U.S. Application Data

(60) Provisional application No. 61/082,578, filed on Jul. 22, 2008.

(51) Int. Cl.
  *G06F 13/00* (2006.01)
  *H04L 12/24* (2006.01)
  *H04L 12/46* (2006.01)
  *H04L 29/06* (2006.01)

(52) U.S. Cl.
  CPC ........ *H04L 41/0859* (2013.01); *H04L 12/4633* (2013.01); *H04L 12/4641* (2013.01); *H04L 41/0803* (2013.01); *H04L 41/18* (2013.01); *H04L 63/0272* (2013.01)

(58) Field of Classification Search
  CPC ... H04L 67/06; H04L 67/12; H04L 29/08117; H04L 41/0253; H04L 63/105; H04L 67/1091; H04L 12/4641; H04L 41/0803; H04L 41/18; H04L 41/0859; H04L 63/0272; H04L 12/4633; H04L 2012/5621

USPC ........ 709/229, 217–219, 220–222, 227, 228, 709/223; 726/15
See application file for complete search history.

(56) References Cited

U.S. PATENT DOCUMENTS

| | | | |
|---|---|---|---|
| 6,728,787 B1 * | 4/2004 | Leigh ............................ | 719/327 |
| 6,848,789 B1 * | 2/2005 | Yancy ..................... | 351/159.74 |
| 7,752,301 B1 * | 7/2010 | Maiocco et al. ............. | 709/224 |
| 7,801,154 B2 * | 9/2010 | Schrock ............. | H04L 12/2697 |
| | | | 370/395.2 |
| 2003/0035430 A1 * | 2/2003 | Islam et al. ................... | 370/401 |

(Continued)

FOREIGN PATENT DOCUMENTS

| | | |
|---|---|---|
| RU | 2136042 | 8/1999 |
| RU | 2253409 | 10/2005 |

(Continued)

OTHER PUBLICATIONS

Australian Office Action dated Jun. 3, 2013, for Appl. No. 2009274149.

(Continued)

*Primary Examiner* — Kenneth R Coulter

(57) ABSTRACT

The present invention relates generally to an Internet based management of software and/or hardware. More particularly, the invention encompasses the development, test, and demonstration of automation solutions using web-based virtual computers and VPN (Virtual Private Network) tunneling. The present invention is also directed to a novel concept of storing various versions of a software and/or demo programs at a virtual data base which is accessible via a VPN (Virtual Private Network) tunnel.

13 Claims, 2 Drawing Sheets

(56) References Cited

U.S. PATENT DOCUMENTS

| | | | |
|---|---|---|---|
| 2003/0036871 A1 | 2/2003 | Andrade | |
| 2003/0041136 A1 | 2/2003 | Cheline | |
| 2005/0066041 A1 | 3/2005 | Chin et al. | |
| 2006/0031832 A1* | 2/2006 | Kishida | 717/176 |
| 2006/0236095 A1* | 10/2006 | Smith et al. | 713/153 |
| 2007/0094367 A1* | 4/2007 | Esfahany et al. | 709/223 |
| 2007/0211739 A1* | 9/2007 | Schrock | H04L 12/2697 370/401 |
| 2007/0300221 A1* | 12/2007 | Hartz et al. | 718/1 |
| 2008/0005260 A1 | 1/2008 | Belimpasakis et al. | |
| 2008/0034408 A1* | 2/2008 | Duggal | 726/4 |
| 2009/0228576 A1* | 9/2009 | Rosenan et al. | 709/221 |
| 2010/0229096 A1* | 9/2010 | Maiocco et al. | 715/734 |

FOREIGN PATENT DOCUMENTS

| | | |
|---|---|---|
| RU | 55484 | 8/2006 |
| RU | 2295753 | 3/2007 |
| RU | 2310903 | 11/2007 |

OTHER PUBLICATIONS

Office Action dated Mar. 22, 2012, from Russian Patent Office (and English translation) for related application.

Canadian Office Action dated Feb. 7, 2013, for Canadian Application No. 2,731,479.

Australian Patent Examination Report No. 2 from Australian Application No. 2009274149 dated Nov. 30, 2012.

* cited by examiner

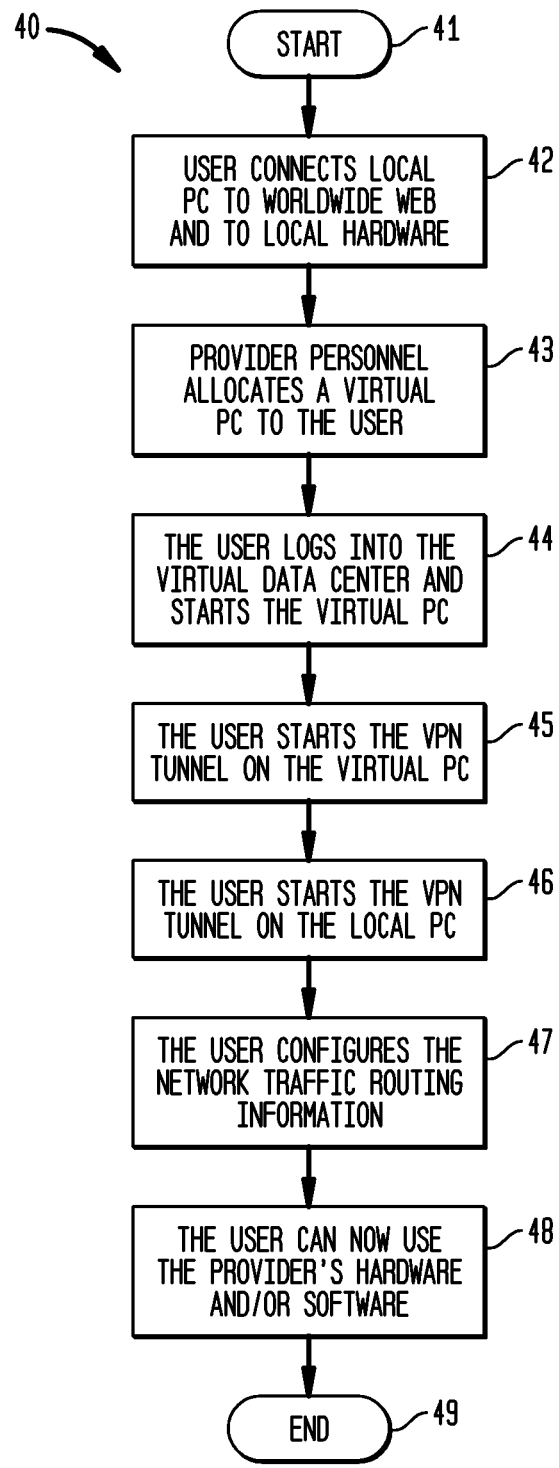

DEVELOPMENT, TEST, AND DEMONSTRATION OF AUTOMATION SOLUTIONS USING WEB-BASED VIRTUAL COMPUTERS AND VPN TUNNELING

CROSS-REFERENCE TO RELATED APPLICATION

The instant patent application claims priority to and the benefit of U.S. Provisional Patent Application Ser. No. 61/082,578, filed on Jul. 22, 2008, titled "The Development, Test, and Demonstration of Automation Solutions Using Web-based Virtual Computers And VPN Tunneling," the entire disclosure of which provisional application is incorporated herein by reference.

FIELD OF THE INVENTION

The present invention relates generally to an Internet based management of software and/or hardware. More particularly, the invention encompasses the development, test, and demonstration of automation solutions using web-based virtual computers and VPN (Virtual Private Network) tunneling. The present invention is also directed to a novel concept of storing various versions of a software and/or demo programs at a virtual data base which is accessible via a VPN (Virtual Private Network) tunnel.

BACKGROUND INFORMATION

The number of subscribers and application of communications services has been growing explosively in the past several decades. As the popularity of world wide web and the Internet based devices has expanded, the underlying technology and applications that enable communications has also been evolving. This evolution has been captured by many new technologies and applications of such technologies.

U.S. Pat. No. 6,445,920 (Matthias Pfundstein), the entire disclosure of which is incorporated herein by reference, discloses to install a virtual private network (VPN) within a given mobile-radio network (MRN), a facility is proposed which is connected to the base stations (BS) and controls the establishment and release of calls between mobile subscribers (MS1 ... MSX) assigned to the coverage area of the base stations, and a data base (HLR) connected to the facility, which contains a subscriber data set (DS) for each of said mobile subscribers with a first logic data set (LDS) for registering them as subscribers of the mobile-radio network. Each of some of these mobile subscribers (MS1, MS2, MS3) has a second logic data set (LDS-VN) for registering them as subscribers of a virtual private network. In this way, in addition to the data set (LDS) allowing access to the mobile-radio network (MRN) as such, the invention adds to the subscriber data set in the existing data base (HLR) a further data set (LDS-VN), which enables a mobile subscriber to access a virtual private network (VPN). Essentially this only requires taking steps in the mobile-radio software area, whereby the installation of one or several virtual private networks can be very easily accomplished. The implementation of an intelligent network which is superimposed on the mobile-radio network can be omitted.

U.S. Pat. No. 6,675,067 (Steven J. Blad), the entire disclosure of which is incorporated herein by reference, discloses a system for remotely monitoring coin-operated machines. Data from the machines is collected and transmitted by the machine to a remote server. In alternate embodiments, several machines may be interconnected via a LAN to a local CPU which transmits data to the remote server, typically using the internet. The combination of one or more remote machines and the central monitoring site form a Virtual Private Network (VPN). An optional feature allows for e-mail or other type of alert messages to be sent from the remote server in response to the identification of one or more predetermined events for which a customer should immediately be notified. Browse and query tools working against a database of machine information are provided so that authorized customers or other interested parties may view data for individual or groups of coin-operated machines by means of a web page accessed via the internet.

U.S. Pat. No. 6,680,922 (Jacob W. Jorgensen), the entire disclosure of which is incorporated herein by reference, discloses a packet-centric wireless point to multi-point telecommunications system includes a wireless base station coupled to a first data network; one or more host workstations coupled to the first data network; one or more subscriber customer premise equipment (CPE) stations in wireless communication with the wireless base station over a shared wireless bandwidth using a packet-centric protocol; and one or more subscriber workstations coupled to each of the subscriber CPE stations over a second network; resource allocator optimizing end-user quality of service (QoS) and allocating shared bandwidth among the subscriber CPE stations; a scheduler to schedule an internet protocol (IP) flow over the shared wireless bandwidth. The scheduler includes a prioritizer for prioritizing the IP flow based on priorities of a virtual private network (VPN). The system can include an analyzer for analyzing the virtual private network (VPN) priorities for the IP flow, or for prioritizing all VPN IP flows. The system can include a prioritizer to prioritize the IP flow based on one or more subscriber-defined parameters. In the system, the VPN can include a directory enabled networking (DEN) table management scheme. The VPN can be implemented using a point-to-point tunneling protocol (PPTP). Also included is a method for accomplishing the above.

U.S. Pat. No. 7,409,201 (Arturo Maria, et al.), the entire disclosure of which is incorporated herein by reference, discloses a system, method, and a computer readable media which are provided for automating the process of provisioning and maintaining Access Point Names ("APNs") for use in digital networks, such as GPRS networks. A plurality of network elements including but not limited to GGSN tables, router tables, firewall systems, VPN tunnels, and Home Location Registry ("HLR") tables can be provisioned and maintained via a centralized system. The invention integrates centralized logging of provisioning, maintenance, and access events, as well as acknowledgement from provisioned network elements, for enhanced security, reporting, and troubleshooting. The invention thus ensures accuracy and reduces operational costs of integrating mobile communications systems with digital networks.

Therefore, there is a need for improvement in a VPN (Virtual Private Network) tunneling, and in particular in the development, test, and demonstration of automation solutions using web-based virtual computers and VPN (Virtual Private Network) tunneling.

This invention improves on the deficiencies of the prior art and provides an inventive development, test, and demonstration of automation solutions using web-based virtual computers and VPN (Virtual Private Network) tunneling.

PURPOSES AND SUMMARY OF THE INVENTION

The invention is a novel development, test, and demonstration of automation solutions using web-based virtual computers and VPN (Virtual Private Network) tunneling.

Therefore, one purpose of this invention is to provide the development, test, and demonstration of automation solutions using web-based virtual computers and VPN (Virtual Private Network) tunneling.

Another purpose of this invention is to provide a reliable solution for a customer to use a provider's software and/or hardware.

Yet another purpose of this invention is to provide a robust virtual data center that has a virtual library of various versions of a provider's software.

Still yet another purpose of this invention is to provide a robust virtual data center that has a virtual library of various versions of a provider's software that can be easily accessed via the Internet or the world wide web.

Therefore, in one aspect this invention comprises a system for remotely accessing provider software, comprising the steps of:
(a) using at least one user device to electronically access the provider software via the Internet;
(b) using said at least one user device to electronically access at least one customer hardware;
(c) establishing at least one virtual private network (VPN) tunnel between said provider software and said at least one customer hardware via said at least one user device and said Internet; and
(d) allowing said user device to perform software function on said customer hardware using said provider software.

In another aspect this invention comprises a method for remotely accessing provider software, said method comprising the steps of:
(a) electronically accessing said provider software via the Internet using at least one user device;
(b) electronically accessing at least one customer hardware using said at least one user device;
(c) establishing at least one virtual private network (VPN) tunnel between said provider software and said at least one customer hardware via said at least one user device and said Internet; and
(d) performing software function on said customer hardware using said provider software and said user device.

In yet another aspect this invention comprises a program storage device readable by machine, tangibly embodying a program of instructions executable by the machine to perform a method for remotely accessing provider software, wherein said method comprises the steps of:
(a) electronically accessing said provider software via the Internet using at least one user device;
(b) electronically accessing at least one customer hardware using said at least one user device;
(c) establishing at least one virtual private network (VPN) tunnel between said provider software and said at least one customer hardware via said at least one user device and said Internet; and
(d) performing software function on said customer hardware using said provider software and said user device.

BRIEF DESCRIPTION OF THE DRAWINGS

Although the scope of the present invention is much broader than any particular embodiment, a detailed description of the preferred embodiment follows together with drawings. These drawings are for illustration purposes only and are not drawn to scale. Like numbers represent like features and components in the drawings. The invention may best be understood by reference to the ensuing detailed description in conjunction with the drawings in which:

FIG. 2 is a detailed flowchart describing some of the salient steps to implement an embodiment of this invention.

DETAILED DESCRIPTION

Figure 1:
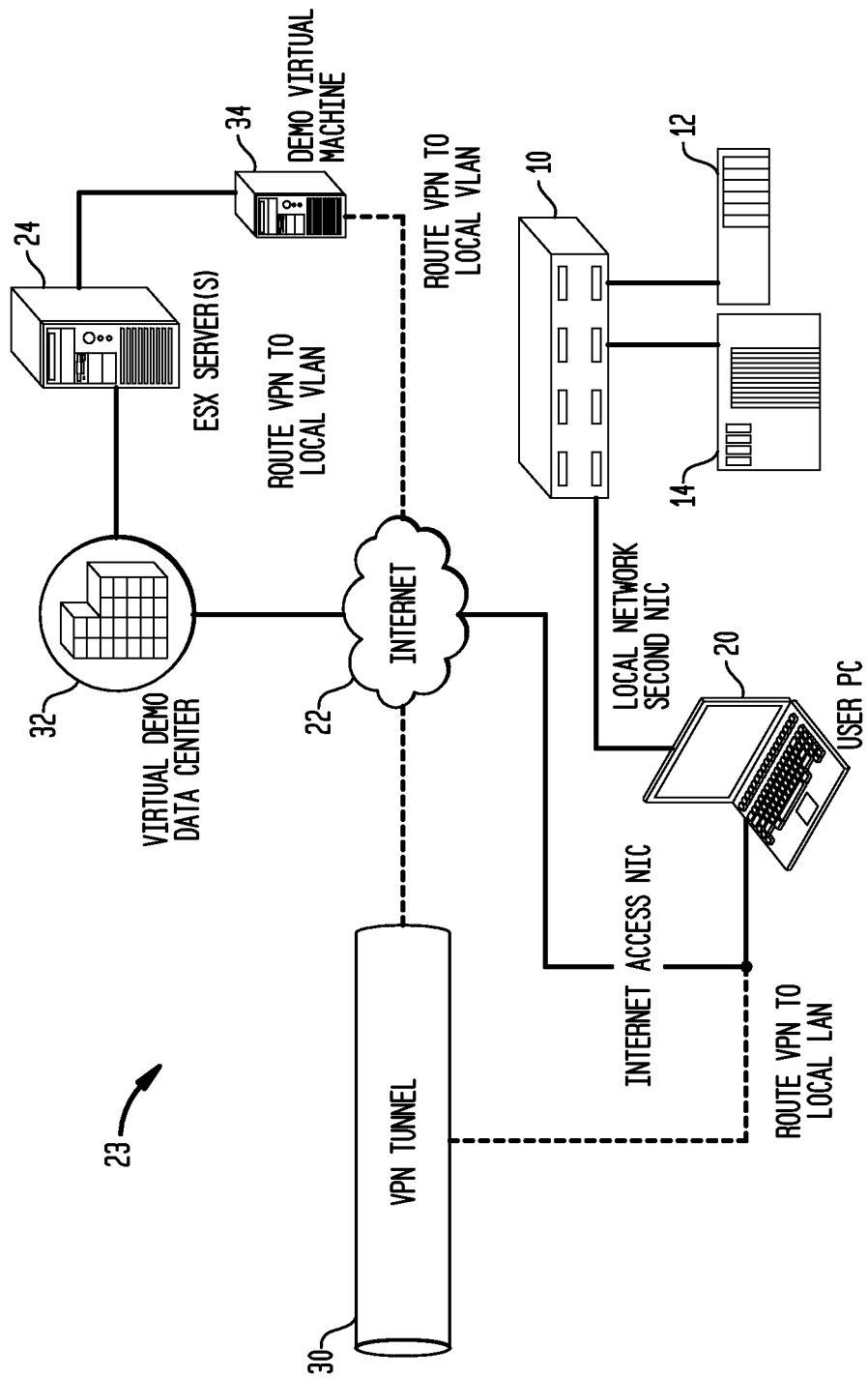
FIG. 1 illustrates an architectural overview of an embodiment of this invention.

This invention is basically directed to the development, test, and demonstration of automation solutions using web-based virtual computers and VPN (Virtual Private Network) tunneling.

With the development of a provider's automation solutions to customers also now involves the providing of software to customers or for providing provider's sales and applications personnel to support the customer. This basically means that the provider's software has to be loaded and ran on a local PC to see and use the provider's technology.

The method of providing a software solution on every specific software and/or hardware application is very time consuming and at time requires provider's support personnel to help get software operational. Time and money may also spent shipping hardware and/or software to customer sites. Also, many times customers balk at loading large software packages onto their computer resources, especially for trial usage. Additionally, provider's sales and application resources have difficulty keeping their software current with the latest version. On the other hand, customer support sometimes needs old versions of software products which cause them to constantly load various versions of software.

With this invention virtual PCs can be preloaded with demonstration applications and various versions of software can be deployed on a centralized computer system (server). The virtual PCs can be accessed via the Internet or the world-wide web, using only a web-browser (no provider's software and/or hardware is required for the PC), making them available to anyone that is approved by the provider. Additionally, a VPN (Virtual Private Network) tunnel can be configured between the virtual PC and any other PC that is connected to the Internet or the world-wide web. This PC can be connected to local provider's automation hardware, such as, for example, a programmable logic controller, allowing the hardware to be programmed and monitored via the provider's software on the virtual PC. Essentially this invention allows programming, monitoring, or any software support of a provider's automation system from anywhere to anywhere in the world, as long as, a connection to the Internet or the world-wide web can be obtained.

FIG. 1 illustrates an architectural overview 23, of an embodiment of this invention. As shown in FIG. 1, a user PC 20, is used to use its web browser to connect to a virtual PC at a Virtual Demo Data Center or a repository 32, via Internet 22, or World Wide Web (WWW) 22. The user PC 20, is also connected to the customer's hardware 10, 12, 14. For some applications one or more of the customer's hardware 10, 12, 14, may have been provided by the provider. The Virtual Demo Data Center 32, is preferably supported by the provider using at least one server 24, and a Demo Virtual Machine 34. It is preferred that the virtual PC has been pre-configured with a correct version of the provider's software and/or demonstration applications. A VPN (Virtual Private Network) tunnel 30, is then created using software on the virtual PC and the local user PC 20. The local user PC 20, routes the virtual PC network traffic to a local network that contains the provider's hardware, 12, 14, such as, for example, a provider's PLC (Programmable Logic Controllers) 12, 14. This allows the software running on the virtual PC to communicate with the local provider's hardware 12, 14. This invention allows a user with only a web browser to use a provider's hardware and/or software. A customer who wants to use or access the virtual PC for their specific application would either have a fixed price contract or they could be charged for usage based on the time or some other mutually agreeable arrangement between the customer and the provider. For some applications the user PC 20, would be connected to the customer's hardware 10, via at least one local network second NIC (Network Interface Controller). For other applications the user PC 20, would connect to the Internet 22, via at least one internal access NIC (Network Interface Controller). Once a VPN (Virtual Private Network) tunnel 30, has been established, the communication from the user PC 20, to the Virtual Demo Data Center 32, and/or the Demo Virtual Machine 34, would be routed via VPN onto local VLAN (virtual local area network).

FIG. 2 is a detailed flowchart 40, describing some of the salient steps to implement an embodiment of this invention. A user would start a user PC 20, at start 41. A user will connect the local PC 20, to the Internet 22, or the Worldwide Web 22, and to the local hardware 10, 12, 14, at step 42. A provider's personnel at some remote location would allocate a virtual PC to the user 20, at step 43. At step 44, the user 20, would log into the virtual data center 32, and start the virtual PC. The user 20, would then start the VPN tunnel 30, on the virtual PC, at step 45. At step 46, the user 20, starts the VPN tunnel 30, on the local PC 20. Then at step 47, the user 20, would configure the network traffic routing information. At step 48, the user 20, can now use the provider's hardware 12, 14, and/or software. Once the user 20, has completed the needed tasks, the user 20, would end the program or task at step 49.

The user device 20, could be selected from a group consisting of a personal computer (PC) 20, a personal digital assistant (PDA) 20, an electronic device 20, and a mobile device 20. For most applications it is preferred that the user device 20, has at least one display means, such as, for example, a screen, a web page, a data entry buttons or fields, to name a few. In most cases at least one of the customer hardware 10, 12, 14, is provided by the provider.

The provider software is preferably located at a provider's virtual data center, however, for some applications the provider software could be located at a virtual data center of a third party. For most applications the provider software is located on at least one server 24, managed by the provider, however, for some applications the server 24, could be managed by a third party provider.

The provider software that is located at the virtual demo data center 32, or the server 24, could be selected from a group consisting of an original version software, an intermediate version software, an updated version software, a current version software, or any other version of the software, to name a few. For most applications the provider software is selected from a group consisting of programming software, diagnostic software, monitoring software, demonstration software, security software, or any other software, to name a few.

As a person skilled in the art can appreciate that with this invention the provider just needs to place at least one version of a software at a virtual data center 32, or a server 24, and anyone authorized to access it can access it at anytime from anywhere in the world. Therefore, any updates or versions or patches of that software can now be placed at the virtual data center 32, or a server 24, without replacing any of the prior versions, and now anyone authorized to access the various versions can access it at anytime from anywhere in the world. Because the software is now residing at a secure and reliable provider's location, the user or the customer does not need to have it on their user device 20, or on the customer hardware 10, 12, 14, or keep a copy of the software at their location or the supporting updates and/or patches. This can be very important when for example a provider has installed a hardware 10, 12, or 14, and lets say after 14 years there is a breakdown or maintenance of that hardware is now required. The customer may or may not have the original software or the version that was installed on that particular hardware 10, 12, or 14. Therefore, now with this invention the customer can just contact the provider and the provider can authorize a user to use a user device 20, to set-up a VPN tunnel 30, and make the necessary repairs or provide the needed maintenance. This way neither the customer nor the user has to worry about if the particular software for a particular hardware is still available or are the software updates or patches still available. This is also true for any demo programs that the provider may be interested in providing to the user and/or customer.

In order to provide a secure connection between the user device 20, and the provider's software, it is preferred that the user device 20, is authenticated by the provider prior to establishing the at least one virtual private network (VPN) tunnel 30. Similarly, in order to provide a secure connection it is preferred that at least one security software monitors the electronic connection between the provider software and the at least one customer hardware. It is preferred that the provider software has at least one means for associating, by an authorized operator, at least one parameter with the at least one virtual private network (VPN) tunnel.

A program storage device readable by machine, tangibly embodying a program of instructions executable by the machine to perform a method for remotely accessing provider software, wherein said method comprises the steps of: (a) electronically accessing said provider software via the Internet using at least one user device; (b) electronically accessing at least one customer hardware using said at least one user device; (c) establishing at least one virtual private network (VPN) tunnel between said provider software and said at least one customer hardware via said at least one user device and said Internet; and (d) performing software function on said customer hardware using said provider software and said user device. While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A method, executing on hardware, for remotely accessing provider software, comprising:
   (a) electronically accessing said provider software via the Internet with a first interface comprising an Internet access network interface controller (NIC) of at least one user device;
   (b) electronically accessing at least one customer hardware with a second interface comprising a local network NIC of said at least one user device;
   (c) establishing at least one virtual private network (VPN) tunnel between said provider software and said at least one customer hardware via said first interface and said second interface of said at least one user device; and
   (d) allowing said at least one user device to perform a software function on said at least one customer hardware via said second interface of said at least one user device with said provider software,
   wherein a virtual personal computer (PC) is preloaded with at least one version of the provider software and demonstration applications, wherein the provider software running on the virtual PC communicates with the at least one customer hardware, and wherein the virtual PC is accessed via the Internet using only a web-browser installed on the at least one user device, and without storing the provider software in the at least one user device or the at least one customer hardware.

2. The method for remotely accessing provider software of claim 1, wherein said at least one user device is selected from a group consisting of a personal computer (PC), a personal digital assistant (PDA), an electronic device, and a mobile device.

3. The method for remotely accessing provider software of claim 1, wherein said provider software is located at a provider's virtual data center.

4. The method for remotely accessing provider software of claim 1, wherein said provider software is located on at least one server managed by said provider.

5. The method for remotely accessing provider software of claim 1, wherein said at least one customer hardware is provided by said provider.

6. The method for remotely accessing provider software of claim 1, wherein said provider software is selected from a group consisting of original version software, intermediate version software, updated version software, and current version software.

7. The method for remotely accessing provider software of claim 1, wherein said at least one user device is authenticated by said provider prior to establishing said at least one virtual private network (VPN) tunnel.

8. The method for remotely accessing provider software of claim 1, wherein at least one security software monitors said electronic connection between said provider software and said at least one customer hardware.

9. The method for remotely accessing provider software of claim 1, wherein said at least one user device has at least one display means.

10. The method for remotely accessing provider software of claim 1, further comprising at least one means for associating, by an authorized operator, at least one parameter with said at least one virtual private network (VPN) tunnel.

11. The method for remotely accessing provider software of claim 1, wherein said provider software is selected from a group consisting of programming software, diagnostic software, monitoring software, demonstration software, and security software.

12. A method, executing on hardware, for remotely accessing provider software, said method comprising:
 (a) electronically accessing said provider software via the Internet with a first interface comprising an Internet access network interface controller (NIC) of at least one user device;
 (b) electronically accessing at least one customer hardware with a second interface comprising a local network NIC of said at least one user device;
 (c) establishing at least one virtual private network (VPN) tunnel between said provider software and said at least one customer software via said first interface and said second interface of said at least one user device; and
 (d) performing software function on said at least one customer hardware via said second interface of said at least one user device with said provider software,
  wherein a virtual personal computer (PC) is preloaded with at least one version of the provider software and demonstration applications,
  wherein the provider software running on the virtual PC communicates with the at least one customer hardware, and
  wherein the virtual PC is accessed via the Internet using only a web-browser installed on the at least one user device, and without storing the provider software in the at least one user device or the at least one customer hardware.

13. A program storage device readable by machine, tangibly embodying a program of instructions executable by the machine to perform a method, executing on hardware, for remotely accessing provider software, wherein said method comprises:
 (a) electronically accessing said provider software via the Internet with a first interface comprising an Internet access network interface controller (NIC) of at least one user device;
 (b) electronically accessing at least one customer hardware with a second interface comprising a local network NIC of said at least one user device;
 (c) establishing at least one virtual private network (VPN) tunnel between said provider software and said at least one customer software via said first interface and said second interface of said at least one user device; and
 (d) performing software function on said at least one customer hardware via said second interface of said at least one user device with said provider software,
  wherein a virtual personal computer (PC) is preloaded with at least one version of the provider software and demonstration applications,
  wherein the provider software running on the virtual PC communicates with the at least one customer hardware, and
  wherein the virtual PC is accessed via the Internet using only a web-browser installed on the at least one user device, and without storing the provider software in the at least one user device or the at least one customer hardware.

* * * * *